United States Patent [19]

Cavanagh et al.

[11] 4,352,831

[45] Oct. 5, 1982

[54] METHOD FOR MANUFACTURING WAFERS

[75] Inventors: John F. Cavanagh, North Providence; Paul A. Cavanagh, Johnston, both of R.I.

[73] Assignee: Cavanagh & Sons, Smithfield, R.I.

[21] Appl. No.: 257,886

[22] Filed: Apr. 27, 1981

[51] Int. Cl.$^3$ ............................................. A21D 13/00
[52] U.S. Cl. ................................... 426/497; 426/502; 426/506; 426/517; 426/518; 426/560
[58] Field of Search ................................ 425/298–299, 425/385; 426/560, 502, 512, 517, 518, 456, 497, 506

[56] References Cited

U.S. PATENT DOCUMENTS

| | | | |
|---|---|---|---|
| 2,589,908 | 3/1952 | Weidenmiller | 425/299 |
| 2,614,511 | 10/1952 | Neutelings | 425/298 |
| 3,937,852 | 2/1976 | Wolf | 426/560 |

FOREIGN PATENT DOCUMENTS 285230  2/1928  United Kingdom ................ 425/298

*Primary Examiner*—Raymond N. Jones
*Assistant Examiner*—Elizabeth A. Hatcher
*Attorney, Agent, or Firm*—William Frederick Werner

[57] ABSTRACT

Wafers are produced by guiding a sheet of bread having friable outer crusts and a relatively soft center through wafer forming apparatus. The apparatus includes a pair of rolls, one of said rolls, i.e., a cutting roll having one or more wafer forming recesses or cavities therein and the other roll being a pressure roll which operates in rolling engagement with the cutting roll. As the sheet of bread is introduced into the nip formed between the two rolls the pressure roll acts to press the bread into the cavity or cavities on the cutting roll and into engagement with the edges of the cavity or cavities to cut wafers from the sheet of bread. Each cavity is configured to have a bottom surface which rises as a gradually tapering wall to a cutting edge which is coterminous with the surface of the cutting roll. Continuous production of wafers is possible with the edges of the wafers being sharply defined, free of undesirable crumbling and devoid of fracture lines.

5 Claims, 9 Drawing Figures

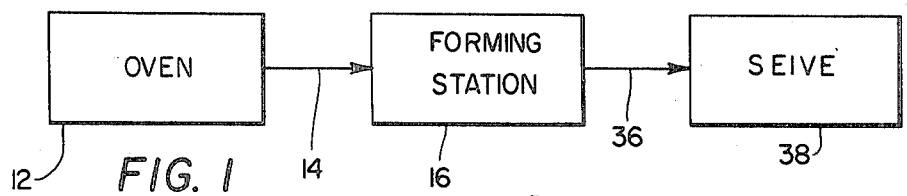
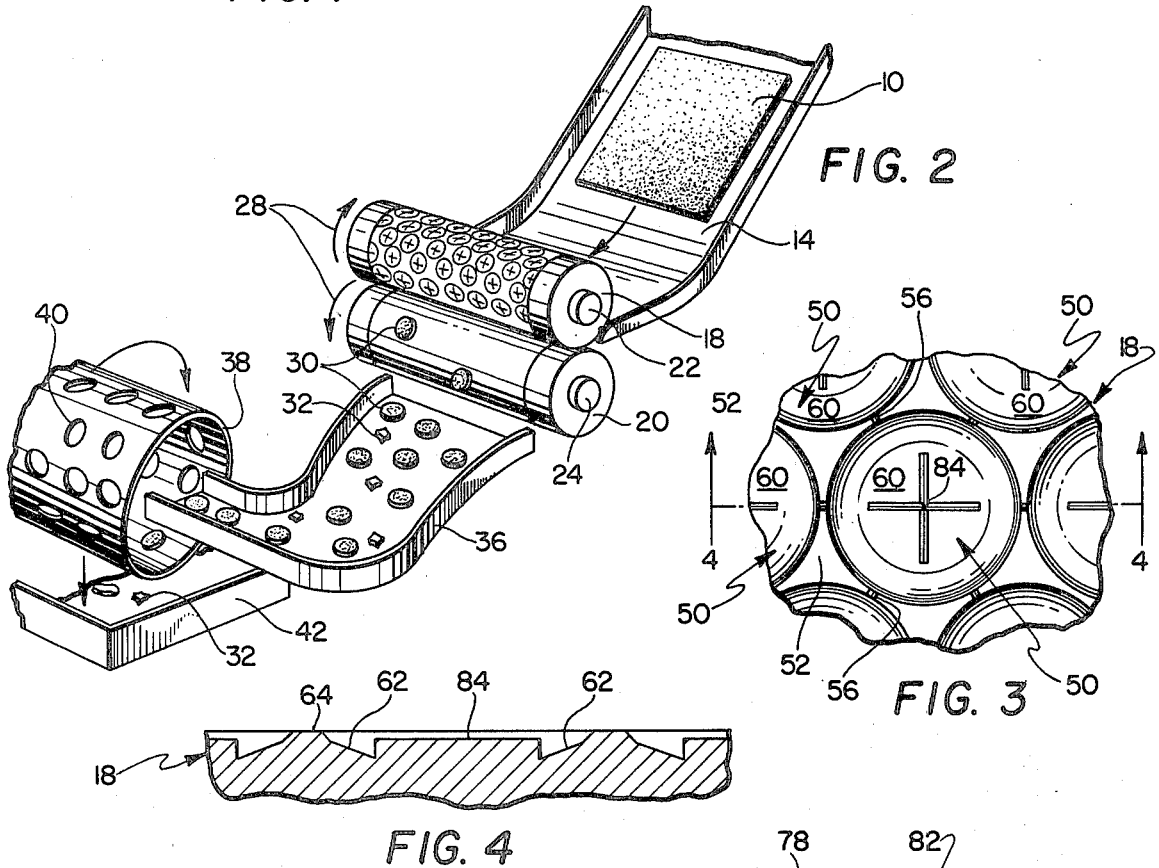

METHOD FOR MANUFACTURING WAFERS

BACKGROUND OF THE INVENTION

The present invention relates to method and apparatus for making wafers from a sheet of bread and relates, more particularly, to the high speed, continuous production of such wafers wherein the wafers possess sharply defined edges, free of fractures or crumbled edges.

In the manufacture of wafers such as those used in the Eucharist it is known to provide thin sheets of unleavened bread from which the communion wafers are punched out on a punch press. In this prior art discontinuous approach to the manufacture of communion wafers, not only is the procedure relatively slow and cumbersome since the product requires considerable manual attention, but, also, the edges of the wafers so produced are subjected to fracturing. This, in turn, causes substantial crumbling of the wafer edges. The irregular edges make the wafers unattractive in appearance and, thus, commercially objectionable. Further, the packages of wafers exhibit the crumbs as loose waste which further renders the wafers commercially inferior.

This aforementioned fracturing is a particular problem with communion wafers and other products produced from unleavened bread, consisting of only a wheat flour and water mixture, since such bread is quite susceptible to crumbling due to its crispness or brittleness. The unleavened bread consists of opposing hard or brittle, but rather smooth or continuous crusts, between which a foraminous, softer center bread layer is situated. This center layer, being porous, yields quite readily under pressure. Thus, by way of demonstration, if one exerts pressure on one outer crust or the other with a sharp tool, the brittle crust breaks since the underlying support, i.e., the porous center readily yields. As the crust breaks, numerous small crust particles are produced since the broken crust actually fractures into many small pieces due to its brittleness. Consequently, in the absence of some control, the edges of a wafer produced on a punch press become flaky, simply because the pressure exerted on the wafer edges during cutting of the wafer out of a sheet of bread are unsupported or unconfined and fractures develop along the opposing crust edges which leads to the aforementioned crumbling of the finished wafers.

It is known to moisten the sheets of bread from which the wafers are formed to reduce the crispness or brittleness of the opposing crusts of the bread during the punch and die operation in an endeavor to avoid the undesirable fracturing of the wafer edges. However, such moisturizing presents certain disadvantages. Firstly, drying time for the wafers formed from moistened bread increases with the amount of moisture present in the wafers. Thus, if sufficient moisture is used to wet the bread to a degree to avoid edge fracturing in wafers formed by the punch and die method, the drying time for the wafers increases to a point where the process becomes uneconomical. The tendency, then, is to punch out the wafers from bread in essentially dry form and, as a consequence, accept the crumbling of the wafer edges. Further, if the sheets of bread are subjected to excessive moisturizing, the bread becomes flaccid and sticky, making it unacceptable for wafer formation.

SUMMARY OF THE INVENTION

In accordance with the present invention new and improved method and apparatus are provided for continuously manufacturing wafers at high speed while providing wafers which have clear, crumb-free edges, said edges not being fractured or inclined to severe crumbling and wherein, as a step in the wafer-forming process, each wafer can be impressed or scored in its surface as desired. In practice with the present invention, sheets of unleavened bread, each having friable outer crusts and a center which is relatively soft and porous, are successively advanced to a wafer forming station where each sheet of bread in succession is advanced through a nip defined between a wafer cutting roll and a pressure roll, these two rolls being in rolling engagement with each other. The pressure exerted by the pressure roll forces the sheet of bread advancing through the nip to be progressively pressed into one or more cavities provided in the cutting roll. These cavities each are of a generally uniform depth corresponding to the thickness of the sheets of bread. Also, each cavity is configured to have a solid bottom with a generally continuous wall rising as a gradually sloping surface to a cutting edge corresponding to the position where the wall intersects the surface of the cutting roll. As succeeding portions of the sheet of bread are pressed into the wafer-forming cavities the outer crusts of the bread are constrained within the molds or wafer-forming cavities. The tapered wall of each recess is formed at an angle such that the edge of the bread being pressed into the cavity to form the wafer is constantly supported to preclude any tendency of the wafer edge to fracture. In the final phase of the wafer forming procedure, the upper bread crust is cut under the pressure exerted by the aforementioned pressure roll. Thereafter, each wafer is dropped under the force of gravity to a receiving station as the cutting roll continues its rotation. The wafers so produced conform to the mold or cavity in which they are formed, the wafers having a generally uniform thickness through the mid-section and tapering along the edges to a relatively sharp edge. A surface of each wafer may be impressed with a design or the like, if desired, by the presence of a design member situated in the recess.

It is, therefore, one object of the present invention to provide a method for the continuous production of wafers from sheets of bread wherein the wafers so produced have sharply defined edges, free of fracture lines and crumbling.

Another object of the present invention is to provide apparatus for the continuous production of wafers wherein the apparatus includes one or more cavities for forming the wafers while the edges are supported throughout the forming operation to thereby avoid fracturing or crumbling of the wafer edges.

Another object is to provide apparatus for the continous production of wafers wherein impressing or scoring of a surface of each wafer is accomplished during the formation of each wafer and without producing undesirable fracturing of the wafer surface which could lead to crumbling.

Other objects of the invention will, in part, be obvious and will, in part, appear hereinafer.

BRIEF DESCRIPTION OF THE DRAWING

FIG. 1 is a block diagram illustrating the continuous process for the manufacture of wafers;

FIG. 2 is a perspective view illustrating the apparatus for delivering sheets of bread to the wafer forming station and apparatus for transfer of the wafers and residue to a separation station;

FIG. 3 is an enlarged detail view of one section of the cutting roll illustrating details of a wafer forming cavity;

FIG. 4 is a view taken along lines 4—4 of FIG. 3;

FIG. 5 is an elevational view of a wafer formed by the prior art punch-and-die method;

FIG. 6 is an elevational view of a wafer manufactured in accordance with the method and apparatus of the present invention;

FIGS. 7 and 8 are detail views illustrating successive positions of a sheet of bread with respect to a cutting roll and companion pressure roll as the bread is formed into wafers; and FIG. 9 is a cross-sectional view of a wafer formed in accordance with the present invention depicting the opposing crusts and porous center therebetween and showing the formation of the wafer edge.

DESCRIPTION OF THE PREFERRED EMBODIMENT

Throughout the specification and claims the term "bread" will be employed for convenience. It is to be understood that in utilizing this term it is intended to embrace all types of products produced from a dough and the like which possess opposing friable outer crusts enclosing a porous or relatively soft center.

With reference initially to FIGS. 1 and 2 of the drawing sheets of bread 10, which may be unleavened bread of the type from which wafers used in the Eucharist are made, are deposited in a humidifier 12. The bread, being made from wheat flour and water, formed into sheets measuring generally 13 inches by 19 inches and approximately 0.070 inches thick may be pre-conditioned by being permitted to reside in the humidifier oven 12 in an environment of approximately 90 percent relative humidity and about 115 degrees F. for generally 18 minutes. It is to be understood that humidifier 12 is equipped with conventional conveyor mechanism for holding a plurality of sheets of bread and for delivering those sheets in sequence to chute 14 aligned with the exit of the conveyor, whereupon the sheets are advanced one-by-one to a wafer forming station 16 which includes a wafer cutting roll 18 and a companion, smooth surface pressure roll 20. The two rolls 18 and 20 are mounted on respective shafts 22 and 24 carried in suitable support bearings (not shown), with the rolls 18 and, 20 in turn, being driven in unison by conventional means such as sprockets and chains from a common power source which may be an electric motor (not shown). Rolls 18 and 20 have surfaces of steel, are of the different diameter and are driven at the same rate of speed, say, 60 R.P.M. with rotation of the respective rolls being in the directions as indicated by the arrows 28 in FIG. 2. The sheets of bread 10 are carried through the nip between rolls 18 and 20 where each sheet in succession is cut into wafers 30 with the remnants 32 of the bread sheet breaking away from the wafers during the wafer formation at station 16. The wafers 30 and remnants 32 provided at station 16 fall by gravity into a chute 36 where they slide along into a rotating generally horizontally disposed barrel or sieve 38 where the remnants 32 are separated out from the wafers 30 by falling through holes 40 into a scrap tray 42. Sieve 38 may be slightly canted downwardly from the sieve end which is proximate to chute 36 so that the wafers 30 are conveyed to the remote end of the sieve where they are dried and packaged. Drying of the wafers processed in accordance with the description hereinbefore described can be accomplished by exposure of 3 minutes at a temperature of 70 degrees F. and humidity at 50 percent relative humidity and this step may be accomplished simultaneously with separation of the wafers from the remnants in sieve 38, or as a separate downstream step.

With more specific attention now to wafer formation at station 16, it will be observed particularly from FIGS. 2 and 3 that cutting roll 18 is provided with a series of cavities 50 which, simply by way of example, may each be of 2.75 inches in diameter. The maximum depth of these cavities 50 coincide with the thickness of the sheets of bread 10. That is to say, with the bread of the present example being 0.070 inches, the depth of each recess 50 on wafer forming roll 18 would also be 0.070 inches. The web and the other irregular shaped areas 52 between the recesses 50 are situated approximately 0.050 inches below the roll surface. To preclude production of a large web each of the cavities is joined by a cutting edge 56 which cuts the web into the aforementioned bread remnants 32. Edge 56 is coterminous with the outside diameter of roll 18 and cutting of the remnants via edge 56 is effected as the surface of pressure roll 20 contacts said edges.

Each cavity 50 is generally constituted as a depression in the surface of roll 18 having a lower smooth surface 60 following the contour of said roll 18. Surface 60 blends into a gradually tapered wall 62 which rises and terminates at a cutting edge 64 at the upper surface of roll 18. As seen in FIG. 4, cutting edge 64 is formed as a flat surface of 0.002–0.003 inches wide to ride against pressure roll 18. Tapered wall 62 is carefully configured to support the edge of each wafer as the wafer is cut and formed by the cooperative action of cutting roll 18 and pressure roll 20. That is, as a sheet of bread 10 enters the nip between rolls 18 and 20, as shown in FIG. 7, the first crust 70, i.e., that crust of the bread which first enters recess 50 is pressed past cutting edge 64 and enters the cavity. Fracturing of that crust is prevented since the crust edge is captured and supported on tapered wall 62 as seen in FIG. 7. As rolls 18 and 20 continue to rotate, the bread 10 moves in a straight-line path as shown in FIG. 8 with the cutting-edge 64 of a given cavity 50 passing through the relatively soft mid-section 72 of the sheet of bread, and then through the opposing bread crusts 74. Tapered wall 62 is desirably held to a dimension such that each wafer produced has a uniform thickness across substantially its full dimension with only that portion of each wafer adjacent to its outer edge being tapered. The tapered walls 62 are thus carefully formed to provide support for each opposing bread crust 70 and 74 to prevent fracturing or flaking thereof which would otherwise occur when the bread described was cut. By way of example, FIG. 5 is a representation of a wafer cut by prior art methods such as by being punched out through a die. Since the edges 78 and 80 of the wafer 82 are not confined but, rather, are free to fracture during passage out of the relatively thin die, flaking occurs the minute bread particles released from the wafers, especially from the edges 78 and 80. This condition yields wafers having uneven, flaky edges. The crumbs produced by such flaking become loose waste on the wafers and in the package containing the wafers. This results in a commerically objectionable product.

In clear contradistinction to the prior art, applicant's invention precludes any fracturing of the edges of the wafers. Enhancing this advantageous result is the configuration of the cavities 50 in the cutting roll 18. It has already been mentioned that each recess comprises a bottom or lower surface 60 which blends into a tapered wall 62 rising to cutting edge 64 at the surface of roll 18. An angle on the wall 62 of between 45 and 70 degrees has been found to produce acceptable results in the environment set forth herein for manufacturing wafers devoid of edge fracturing.

A further feature of the present invention is the ability to impress or score each wafer as it is being formed without producing fractures which could otherwise lead to the undesirable crumbling of the wafer surface hereinbefore discussed. Thus, as illustrated best in FIGS. 2, 4, 7 and 8 a boss or forming element 84, here shown as a boss for making a cross in one surface of each wafer, is formed integrally with roll 18 and rises in the center of each cavity 50. The boss 84 is, of course, but one design that can be impressed into the surface of the wafers and is shown merely as an example of an element. Boss 84 extends upwardly from the bottom 60 of cavity 50 for approximately 0.050 inches to preclude its cutting through the wafer. In addition to the advantage of being able to impress or score each wafer as a simultaneous step in wafer formation, the present embossing technique has the further advantage that the impressing or scoring of each wafer is accurately positioned and repeatable throughout the wafer manufacturing process. Thus, if the design to be impressed into the wafers is a cross, that cross can be accurately situated in the center of each and every wafer simply by insuring that each separate forming element is positioned in the center of its associated cavity 50 at the manufacturing of cutting roll 18. Manufacturing of cutting roll 18 may be achieved by employment of the technique known as electric discharge machining.

It should be appreciated that the instant invention is not to be construed as being limited by the examples and operating conditions set forth herein. It is to be understood that the present invention may be embodied in other forms and that the operating conditions as discussed herein may be varied without departing from the spirit or essential attributes of the invention, all of which are intended to be encompassed by the appended claims.

What is claimed is:

1. A method of manufacturing wafers from a sheet of bread having first and second opposing friable outer crusts enclosing a center which is softer than said crusts comprising the steps of, advancing said sheet of bread to a rotating wafer former including a cavity having a fixed bottom portion and a gradually sloping surface rising from said bottom portion and terminating in a cutting edge around the upper edge of said cavity; rotating a pressure roll against said cutting edge of said rotating wafer former to progressively and sequentially press said first crusts, center and second crust into said cavity while simultaneously cutting a wafer out of said sheet of bread; continuously maintaining the edges of said first crust, center and second crust which have been cut and pressed into said cavity in constant contact with said gradually sloping surface of said cavity; and supporting said first crust which has been cut and pressed into said cavity on the fixed bottom portion of said cavity as said second crust is progressively cut.

2. A method as set forth in claim 1 including the step of impressing without fracturing at least one surface of said wafer as said wafer is cut from said sheet.

3. A method as set forth in claim 1 including the step of moisturizing said sheet of bread in an environment of approximately 90 percent relative humidity at about 115° F. for approximately 18 minutes prior to advancing said bread to said wafer former and drying each said wafer formed by said wafer former.

4. A method as set forth in claim 1 including the step of impressing at least one surface of each said wafer as each said wafer is formed and cut from said sheet of bread.

5. A method as set forth in claim 4 including the step of simultaneously forming and cutting a plurality of wafers from each said sheet of bread.

* * * * *